US012299957B2

(12) United States Patent
Piao

(10) Patent No.: US 12,299,957 B2
(45) Date of Patent: May 13, 2025

(54) LEARNING APPARATUS, LEARNING METHOD, AND RECORDING MEDIUM

(71) Applicant: NEC Corporation, Tokyo (JP)

(72) Inventor: Jun Piao, Tokyo (JP)

(73) Assignee: NEC CORPORATION, Tokyo (JP)

(*) Notice: Subject to any disclaimer, the term of this patent is extended or adjusted under 35 U.S.C. 154(b) by 371 days.

(21) Appl. No.: 17/792,860

(22) PCT Filed: Jan. 30, 2020

(86) PCT No.: PCT/JP2020/003554
§ 371 (c)(1),
(2) Date: Jul. 14, 2022

(87) PCT Pub. No.: WO2021/152801
PCT Pub. Date: Aug. 5, 2021

(65) Prior Publication Data
US 2023/0052101 A1 Feb. 16, 2023

(51) Int. Cl.
G06V 10/764 (2022.01)
G06T 7/194 (2017.01)
G06V 10/774 (2022.01)

(52) U.S. Cl.
CPC ............ *G06V 10/764* (2022.01); *G06T 7/194* (2017.01); *G06V 10/774* (2022.01); *G06V 2201/07* (2022.01)

(58) Field of Classification Search
CPC ............... G06V 10/764; G06V 10/774; G06V 2201/07; G06V 10/778; G06V 20/70; G06T 7/194; G06T 7/00; G06N 20/00
USPC ........................................................ 382/103
See application file for complete search history.

(56) References Cited

U.S. PATENT DOCUMENTS

2017/0103510 A1* 4/2017 Wang .................. G06T 7/33
2018/0047173 A1* 2/2018 Wang .................. G06T 7/62
(Continued)

FOREIGN PATENT DOCUMENTS

CN 101123721 * 2/2008
CN 103985114 * 8/2016
(Continued)

OTHER PUBLICATIONS

Wonhee Lee et al., "Multi-Task Self-Supervised Object Detection via Recycling of Bounding Box Annotations", 2019 IEEE/CVF Converence on Computer Vision and Pattern Recognition )CVPR); Jun. 15, 2019, pp. 4779-4988 (Year: 2019).*

(Continued)

*Primary Examiner* — Jerome Grant, II

(57) ABSTRACT

In a learning apparatus, an acquisition unit acquires image data and label data corresponding to the image data. An object candidate extraction unit extracts each object candidate rectangle from the image data. A correct answer data generation unit generates a background object label corresponding to each background object included in each object candidate rectangle as correct answer data corresponding to the object candidate rectangle by using the label data. A prediction unit predicts a classification using each object candidate rectangle and outputs a prediction result. An optimization unit optimizes the object candidate extraction unit and the prediction unit using the prediction result and the correct answer data.

7 Claims, 13 Drawing Sheets

(56) References Cited

U.S. PATENT DOCUMENTS

| | | | |
|---|---|---|---|
| 2018/0342077 A1 | 11/2018 | Tsuno et al. | |
| 2019/0050681 A1 | 2/2019 | Tate | |
| 2020/0250971 A1* | 8/2020 | Zhao | G06F 18/241 |
| 2020/0304916 A1* | 9/2020 | Asfaw | H04S 7/303 |
| 2020/0372659 A1* | 11/2020 | Hagiopol | G06T 7/564 |

FOREIGN PATENT DOCUMENTS

| | | | | |
|---|---|---|---|---|
| CN | 109063562 | * | 12/2018 | G06V 20/10 |
| CN | 110009614 | * | 7/2019 | G01N 21/8851 |
| JP | 4596220 | * | 12/2010 | G06T 5/70 |
| JP | 2017-146840 A | | 8/2017 | |
| JP | 2017-162025 A | | 9/2017 | |
| JP | 2018-200531 A | | 12/2018 | |
| JP | 2019-032773 A | | 2/2019 | |
| JP | 2019-159787 A | | 9/2019 | |
| WO | WO2020173036 | * | 9/2020 | G06N 3/045 |

OTHER PUBLICATIONS

Yihui He et al., "Bounding Box Regression With Uncertainty for Accurate Object Detection", 2019 IEEE/CVF Conference on Computer Vision and Pattern Recognition (CVPR); Jun. 15, 2019, pp. 2883-2892 (Year: 2019).*

International Search Report for PCT Application No. PCT/JP2020/003554, mailed on Apr. 14, 2020.

Atsumi, Masayasu, "Co-occurrence Object Recognition based on Learning a Labeled Object Category Tree from Foreground/Background Contexts", Proceedings of the 26th Annual Conference of the Japanese Society for Artificial Intelligence, Jun. 12, 2012, pp. 1-4.

JP Office Action for JP Application No. 2021-574388, mailed on May 16, 2023 with English Translation.

Takayuki Okatani, "Research Trend in Deep Learning for Visual Recognition", [Journal] Artificial Intelligence, The Japanese Society for Artificial Intelligence, vol. 31, No. 2, Mar. 1, 2016, pp. 169-179.

Wonhee Lee et al., "Multi-Task Self-Supervised Object Detection via Recycling of Bounding Box Annotations", 2019 IEEE/CVF Conference on Computer Vision and Pattern Recognition (CVPR), Jun. 15, 2019, pp. 4979-4988.

Yihui He et al., "Bounding Box Regression With Uncertainly for Accurate Object Detection", 2019 IEEE/CVF Conference on Computer Vision and Pattern Recognition (CVPR), Jun. 15, 2019, pp. 2883-2892.

* cited by examiner

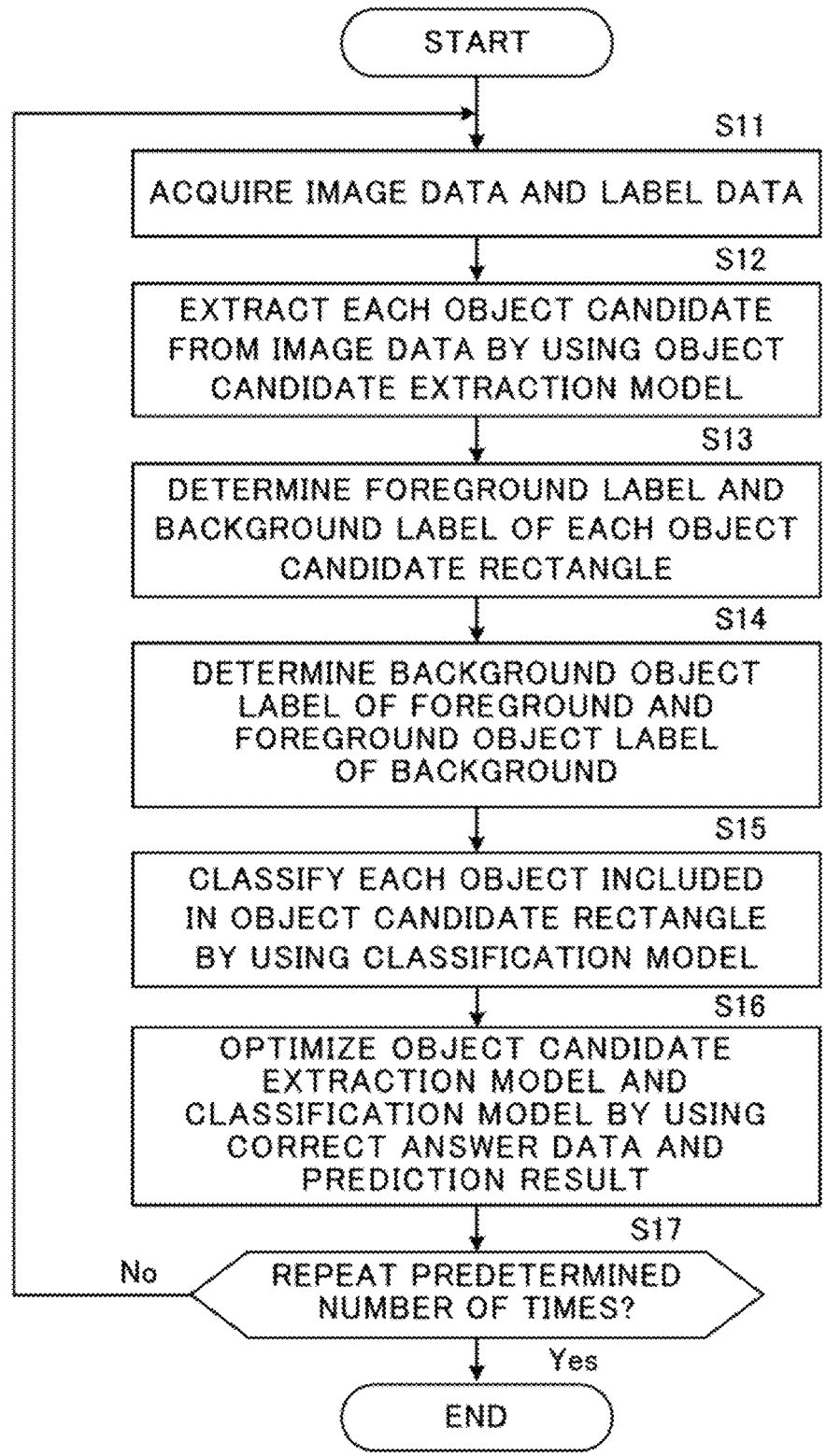

<FORMAT OF CORRECT ANSWER DATA>

FIG. 5A (FORMAT A) | FOREGROUND LABEL | BACKGROUND OBJECT LABEL OF FOREGROUND | BACKGROUND LABEL | BACKGROUND OBJECT LABEL OF FOREGROUND |

FIG. 5B (FORMAT B) | BACKGROUND OBJECT LABEL OF FOREGROUND | BACKGROUND OBJECT LABEL OF BACKGROUND |

FIG. 5C (FORMAT C) | FOREGROUND / BACKGROUND LABEL | BACKGROUND OBJECT LABEL |

FIG. 5D (FORMAT D) | BACKGROUND LABEL | BACKGROUND OBJECT LABEL |

FIG. 6

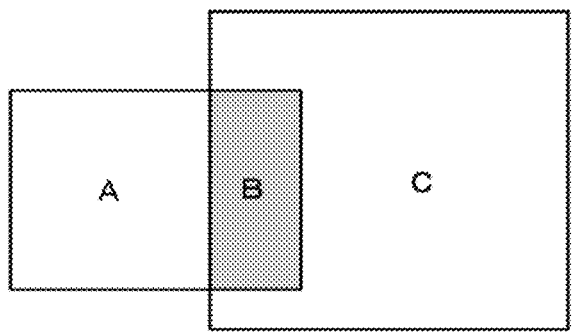

REGION A+B: RECTANGLE OF
           BACKGROUND OBJECT
REGION C: FOREGROUND RECTANGLE OR
          BACKGROUND RECTANGLE
REGION B: OVERLAP REGION

<DETERMINATION METHOD FOR VALUE OF LABEL>

(LABEL TYPE 1) "1" WHEN OBJECT IS INCLUDED (LABEL TYPE 2) USE IOU OF OBJECT = $\dfrac{B}{A+B+C}$ (LABEL TYPE 3) USE AREA RATE R2 OF OBJECT
               INCLUDED IN RECTANGLE (LABEL TYPE 4) REPRESENT ONE LABEL
               BY TWO AREA RATES [R1, R2]

(LABEL TYPE 5) REPRESENT ONE LABEL
               BY IOU AND AREA RATE [IOU, R2]

$$\text{AREA RATE R1} = \frac{\text{AREA (B) OF BACKGROUND OBJECT INCLUDED IN RECTANGLE}}{\text{AREA (A+B) OF BACKGROUND OBJECT}}$$

$$\text{AREA RATE R2} = \frac{\text{AREA (B) OF BACKGROUND OBJECT INCLUDED IN RECTANGLE}}{\text{AREA (C) OF RECTANGLE}}$$

FIG. 8

(FORMAT A: LABEL TYPE 1)

| RECTANGLE ID | FOREGROUND LABEL | | | BACKGROUND OBJECT LABEL OF FOREGROUND | | |
|---|---|---|---|---|---|---|
| | CAR | PERSON | TREE | CAR | PERSON | TREE |
| 41 | 0 | 1 | 0 | 1 | 1 | 0 |
| 42 | 0 | 1 | 0 | 0 | 1 | 0 |
| 43 | 0 | 1 | 0 | 0 | 1 | 1 |

| RECTANGLE ID | BACKGROUND LABEL | | | BACKGROUND OBJECT LABEL OF BACKGROUND | | |
|---|---|---|---|---|---|---|
| | CAR | PERSON | TREE | CAR | PERSON | TREE |
| 51 | 0 | 0 | 0 | 0 | 0 | 0 |
| 52 | 0 | 0 | 0 | 1 | 1 | 1 |
| 53 | 0 | 0 | 0 | 0 | 1 | 1 |

FIG. 9

(FORMAT A: LABEL TYPE 2)

| RECTANGLE ID | FOREGROUND LABEL | | | BACKGROUND OBJECT LABEL OF FOREGROUND | | |
|---|---|---|---|---|---|---|
| | CAR | PERSON | TREE | CAR | PERSON | TREE |
| 41 | 0 | 1 | 0 | 0.2 | 0.8 | 0 |
| 42 | 0 | 1 | 0 | 0 | 0.9 | 0 |
| 43 | 0 | 1 | 0 | 0 | 0.85 | 0.5 |

| RECTANGLE ID | BACKGROUND LABEL | | | BACKGROUND OBJECT LABEL OF BACKGROUND | | |
|---|---|---|---|---|---|---|
| | CAR | PERSON | TREE | CAR | PERSON | TREE |
| 51 | 0 | 0 | 0 | 0 | 0 | 0 |
| 52 | 0 | 0 | 0 | 0.35 | 0.25 | 0.2 |
| 53 | 0 | 0 | 0 | 0 | 0.3 | 0.4 |

FIG. 10

(FORMAT C: LABEL TYPE 1)

| RECTANGLE ID | FOREGROUND / BACKGROUND LABEL | BACKGROUND OBJECT LABEL | | |
|---|---|---|---|---|
| | FOREGROUND / BACKGROUND | CAR | PERSON | TREE |
| 41 | 1 | 1 | 1 | 0 |
| 42 | 1 | 0 | 1 | 0 |
| 43 | 1 | 0 | 1 | 1 |
| 51 | 0 | 0 | 0 | 0 |
| 52 | 0 | 1 | 1 | 1 |
| 53 | 0 | 0 | 1 | 1 |

FIG. 11

(FORMAT C: LABEL TYPE 3)

| REC-TANGLE ID | FOREGROUND / BACKGROUND LABEL | BACKGROUND OBJECT LABEL | | |
|---|---|---|---|---|
| | FOREGROUND / BACKGROUND | CAR | PERSON | TREE |
| 41 | 1 | 0.2 | 0.7 | 0 |
| 42 | 1 | 0 | 0.6 | 0 |
| 43 | 1 | 0 | 0.65 | 0.3 |
| 51 | 0 | 0.3 | 0 | 0 |
| 52 | 0 | 0.2 | 0.1 | 0.1 |
| 53 | 0 | 0 | 0.2 | 0.3 |

FIG. 12

(FORMAT D: LABEL TYPE 3)

| | BACKGROUND LABEL | BACKGROUND OBJECT LABEL | | |
|---|---|---|---|---|
| REC-TANGLE ID | BACKGROUND | CAR | PERSON | TREE |
| 41 | 0.1 | 0.2 | 0.7 | 0 |
| 42 | 0.4 | 0 | 0.6 | 0 |
| 43 | 0.05 | 0 | 0.65 | 0.3 |
| 51 | 0.7 | 0.3 | 0 | 0 |
| 52 | 0.6 | 0.2 | 0.1 | 0.1 |
| 53 | 0.5 | 0 | 0.2 | 0.3 |

LEARNING APPARATUS, LEARNING METHOD, AND RECORDING MEDIUM

This application is a National Stage Entry of PCT/JP2020/003554 filed on Jan. 30, 2020, the contents of all of which are incorporated herein by reference, in their entirety.

TECHNICAL FIELD

The present disclosure relates to a technique for detecting an object included in an image.

BACKGROUND ART

In recent years, various object detection techniques using machine learning have been proposed. A common object detection technique identifies each region of one or more objects included in an image, and outputs a label for each object and coordinates for each region. Patent Document 1 discloses an example of such the object detection method.

PRECEDING TECHNICAL REFERENCES

Patent Document

Patent Document 1: Japanese Laid-open Patent Publication No. 2017-146840

SUMMARY

Problem to be Solved by the Invention

The object detection apparatus as described above detects an object focusing on a target object in a region extracted from an image. However, in an actual image, a background in the region where the target object is extracted and the object existing in the background often have some relation with the target object.

It is one object of the present disclosure to provide an object detection technique capable of improving accuracy of an object detection by considering each object existing in the background in the extracted region.

Means for Solving the Problem

According to an example aspect of the present disclosure, there is provided a learning apparatus including:
an acquisition unit configured to acquire image data and label data corresponding to the image data;
an object candidate extraction unit configured to extract each object candidate rectangle from the image data;
a prediction unit configured to predict a classification using each object candidate rectangle and output a prediction result;
a correct answer data generation unit configured to generate a background object label corresponding to each background object included in the object candidate rectangle as correct answer data corresponding to the object candidate rectangle by using the label data; and
an optimization unit configured to optimize the object candidate extraction unit and the prediction unit by using the prediction result and the correct answer data.

According to another example aspect of the present disclosure, there is provided a learning method, including:
acquiring image data and label data corresponding to the image data;
extracting each object candidate rectangle from the image data;
predicting a classification using each object candidate rectangle and outputting a prediction result;
generating a background object label corresponding to each background object included in the object candidate rectangle as correct answer data corresponding to the object candidate rectangle by using the label data; and
optimizing the extracting of each object candidate rectangle and the predicting of the classification by using the prediction result and the correct answer data.

According to still another example aspect of the present disclosure, there is provided a recording medium storing a program, the program causing a computer to perform a process including:
acquiring image data and label data corresponding to the image data;
extracting each object candidate rectangle from the image data;
predicting a classification using each object candidate rectangle and outputting a prediction result;
generating a background object label corresponding to each background object included in the object candidate rectangle as correct answer data corresponding to the object candidate rectangle by using the label data; and
optimizing the extracting of each object candidate rectangle and the predicting of the classification by using the prediction result and the correct answer data.

Effect of the Invention

According to the present disclosure, it is possible to improve accuracy of an object detection by considering each object existing in a background in an extracted region.

BRIEF DESCRIPTION OF THE DRAWINGS

FIG. 4 is a flowchart of a learning process.

FIG. 5 illustrates a format example of correct answer data.

FIG. 6 illustrates an example of a background object label.

FIG. 8 illustrates an example of the correct answer data.

FIG. 9 illustrates another example of the correct answer data.

FIG. 10 illustrates another example of the correct answer data.

FIG. 11 illustrates another example of the correct answer data.

FIG. 12 illustrates another example of the correct answer data.

EXAMPLE EMBODIMENTS

In the following, example embodiments will be described with reference to the accompanying drawings.

First Example Embodiment (Hardware Configuration)

Figure 1:
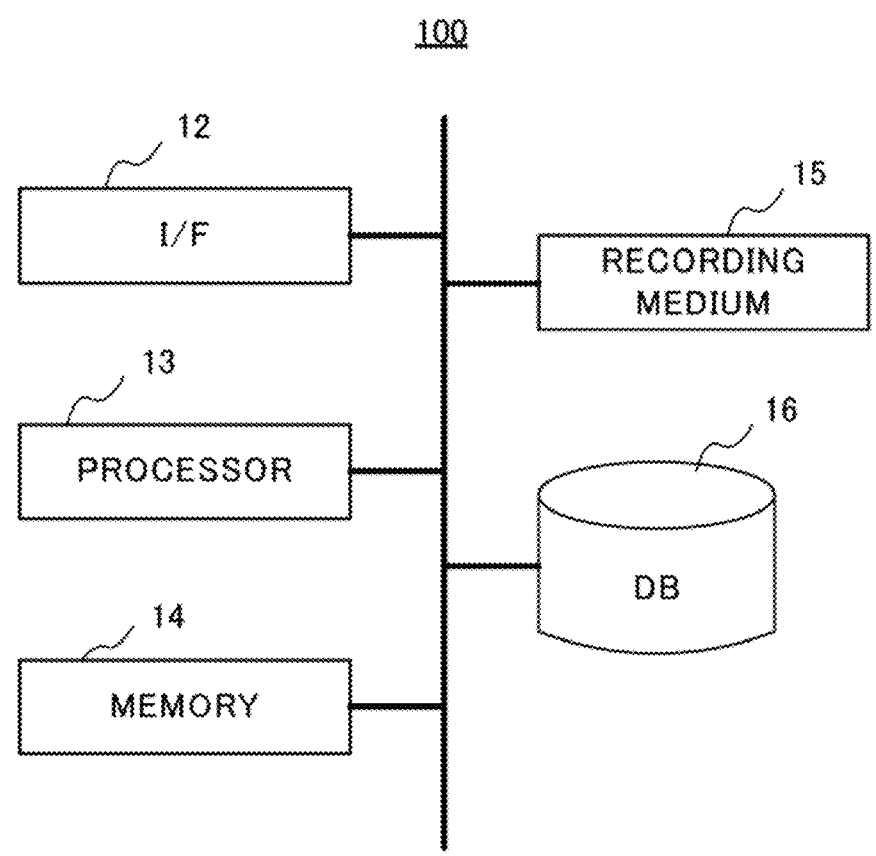
FIG. 1 illustrates a hardware configuration of a learning apparatus according to a first example embodiment.

FIG. 1 is a block diagram illustrating a hardware configuration of a learning apparatus 100 of an object detection model according to a first example embodiment. As illustrated, a learning apparatus 100 includes an interface (I/F) 12, a processor 13, a memory 14, a recording medium 15, and a database (DB) 16.

The interface 12 performs a data input and output to and from an external apparatus. Specifically, training data used for learning of the learning apparatus 100 and the image data to be a target of an object detection are input through the interface 12.

The processor 13 is a computer such as a CPU (Central Processing Unit) or a GPU (Graphics Processing Unit) with the CPU, and controls the entire learning apparatus 100 by executing a program prepared in advance. Specifically, the processor 13 executes a learning process to be described later.

The memory 14 is formed by a ROM (Read Only Memory), a RAM (Random Access Memory), or the like. The memory 14 stores an object detection model to be learned by the learning apparatus 100. The memory 14 is also used as a working memory during executions of various processes by the processor 13.

The recording medium 15 is a non-volatile and non-transitory recording medium such as a disk-shaped recording medium, a semiconductor memory, or the like, and is formed to be detachable from the learning apparatus 100. The recording medium 15 records various programs executed by the processor 13. When the learning apparatus 100 executes various kinds of processes, a program recorded on the recording medium 15 is loaded into the memory 14 and executed by the processor 13.

The database 16 stores training data used for training the object detection model and image data to be a subject of the object detection. In addition to the above, the learning apparatus 100 may include an input device or a display section such as a keyboard or a mouse for a user to perform instructions or inputs.

(Functional Configuration)

Figure 2:
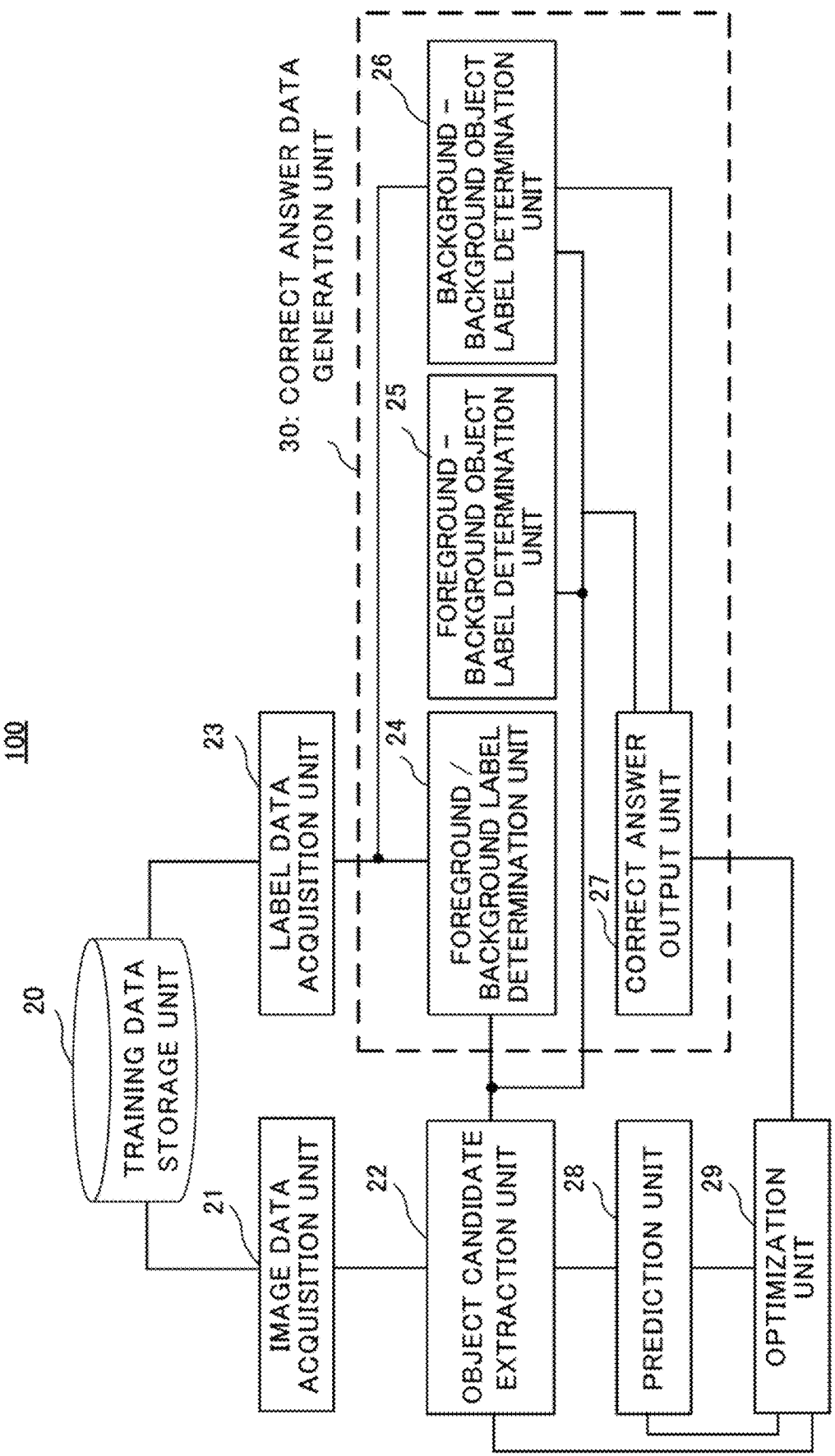
FIG. 2 is a block diagram illustrating a functional configuration of the learning apparatus.

FIG. 2 is a block diagram illustrating a functional configuration of the learning apparatus 100 of the object detection model. As illustrated, the learning apparatus 100 includes a training data storage unit 20, an image data acquisition unit 21, an object candidate extraction unit 22, a label data acquisition unit 23, a prediction unit 28, an optimization unit 29, and a correct answer data generation unit 30. The correct answer data generation unit 30 includes a foreground/background label determination unit 24, a foreground-background object label determination unit 25, a background-background object label determination unit 26, and a correct answer data output unit 27.

The training data storage unit 20 stores training data used for learning of the learning apparatus 100. The training data are regarded as data prepared in advance for training the object detection model, and includes a plurality of sets of image data and sets of label data indicating respective correct answer labels (Ground Truth) for the sets of image data.

The image data acquisition unit 21 acquires image data from the training data storage unit 20 and outputs the image data to the object candidate extraction unit 22. As the image data used for learning, the image data including an object to be detected and the image data not including an object are prepared. The object to be detected corresponds to an object to be detected by the learning apparatus 100, and is regarded as the object of a predetermined class determined in advance. In the following explanations, each object to be detected corresponds to one of three classes of a "person," a "car," and a "tree".

The label data acquisition unit 23 acquires label data corresponding to the image data from the training data storage unit 20. The label data are prepared as a pair with the image data included in the training data, and includes a position of a rectangular representing a detected target object included in the image data and a label of the detected target object. The label data acquisition unit 23 outputs the acquired label data to the foreground/background label determination unit 24, the foreground-background object label determination unit 25, and the background-background object label determination unit 26.

Figure 3:
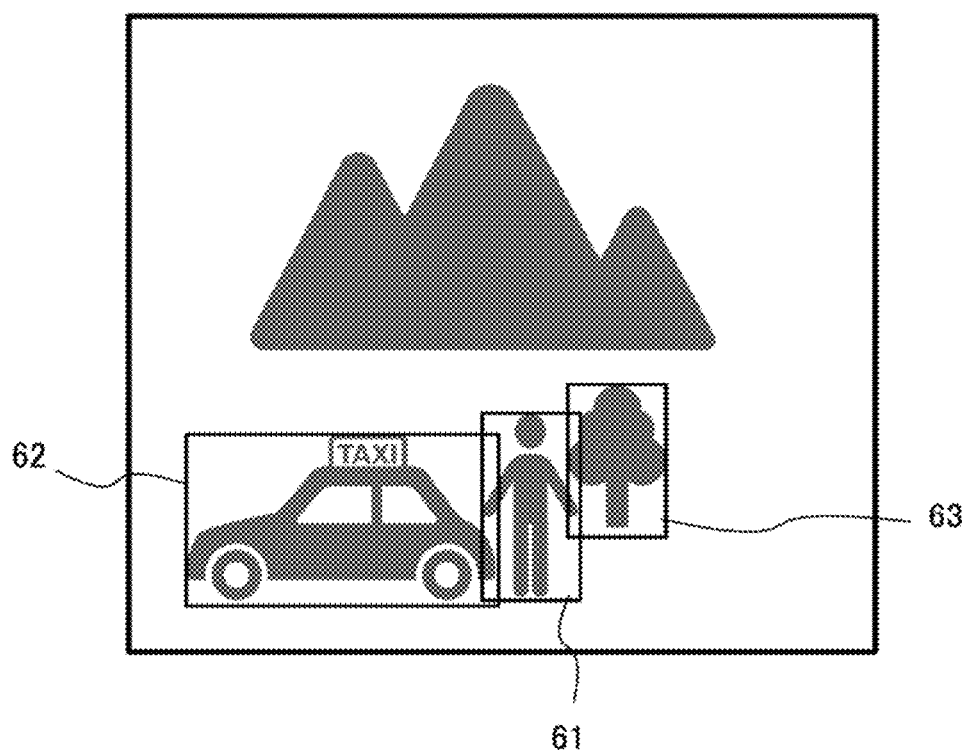
FIG. 3 illustrates an example of image data included in training data.

FIG. 3 illustrates an example of the image data included in the training data. In the present example embodiment, since an object to be detected is a person, a car, or a tree, the label data for the image data includes a correct answer label 61 of the person, a correct answer label 62 of the car, and a correct answer label 63 of the tree. Since a "mountain" in the image data is not the object to be detected, the "mountain" is not included in the label data.

The object candidate extraction unit 22 extracts an object candidate from the image data using an object candidate extraction model. The object candidate is regarded as a region that is predicted to be likely an object. For instance, the object candidate extraction model is formed by a VGG and a RPN (Region Proposal Network), and in this case, a region proposal obtained by the RPN is used as the object candidate. The object candidate extraction unit 22 outputs a rectangle (hereinafter, referred to as an "object candidate rectangle") of the extracted object candidate to the foreground/background label determination unit 24, the foreground-background object label determination unit 25, and the background-background object label determination unit 26. Moreover, the object candidate extraction unit 22 may further output a prediction result of a classification for each object included in the object candidate rectangle using a foreground background prediction model. The foreground background prediction model corresponds to a model using a neural network, or the like.

The foreground/background label determination unit 24 determines a foreground label and a background label for the object candidate rectangle based on the object candidate rectangle and the label data. The foreground label and the background label indicate whether the object candidate rectangle is a foreground rectangle or a background rectangle. That is, the foreground/background label determination unit 24 determines whether the object candidate rectangle extracted by the object candidate extraction unit 22 is the foreground rectangle or the background rectangle. Specifically, in a case where a degree of an overlap of the object candidate rectangle extracted by the object candidate extraction unit 22 from the image data and the correct answer label (see FIG. 3) in the image data is equal to or greater than a first predetermined value, the foreground/background label determination unit 24 determines that the rectangle is the "foreground rectangle", and in a case where the degree of the overlap is equal to or less than a second predetermined value, the foreground/background label determination unit 24 determines that the rectangle is the "background rectangle". As one embodiment, the foreground/background label determination unit 24 determines the degree of the overlap using an IOU (Intersection Over Union). For instance, the foreground/background label determination unit 24 determines that the rectangle is the foreground rectangle when IOU>0.7, and determines that the rectangle is the background rectangle when IOU<0.3. After that, the foreground/background label determination unit 24 outputs the foreground label indicating whether or not the object candidate rectangle is the foreground rectangle and the background label indicating whether or not the object candidate rectangle is the background rectangle, to the correct answer data output unit 27.

The foreground-background object label determination unit 25 determines the background object label of the foreground based on the label data and the object candidate rectangle extracted by the object candidate extraction unit 22. The "background object label of the foreground" refers to a label of each object included in the object candidate rectangle determined to be the foreground rectangle by the foreground/background label determination unit 24. Specifically, the foreground-background object label determination unit 25 applies the background object label of the foreground to a detected target object included in the foreground rectangle using the label data, and outputs the detected target object to the correct answer data output unit 27. Note that the background object label of the foreground may include not only the label of the background object included in the foreground rectangle but also the label of the foreground object included in the foreground rectangle.

The background object label determination unit 26 determines the background object label of the background based on the label data and the object candidate rectangle extracted by the object candidate extraction unit 22. The "background object label of background" refers to a label of an object included in the object candidate rectangle which the foreground/background label determination unit 24 determines as the background rectangle. Specifically, the background object label determination unit 26 of the background applies the background object label of the background to the detected target object included in the background rectangle using the label data, and outputs the detected target object to the correct answer data output unit 27.

The correct answer data output unit 27 outputs, as the correct answer data, the foreground label and the background label which are input from the foreground/background label determination unit 24, the background object label of the foreground which is input from the foreground-background object label determination unit 25, and the background object label of the background which is input from the background-background object label determination unit 26, to the optimization unit 29.

The prediction unit 28 classifies an object included in the object candidate rectangle extracted by the object candidate extraction unit 22, and outputs a result of the classification. Specifically, the prediction unit 28 uses a classification model using a neural network or the like to classify each object from the image data. In detail, the prediction unit 28 extracts a feature amount from the object candidate rectangle, classifies a detected target object included in the object candidate rectangle based on the feature amount, and integrates the object candidate rectangles classified into the same class. After that, the prediction unit 28 outputs the label of each detected target object included in the integrated rectangle (hereinafter, referred to as an "object rectangle") and coordinates of the integrated rectangle to the optimization unit 29 as a prediction result. Furthermore, the prediction unit 28 may output a modification result of a rectangular using a rectangular modification model for modifying a position and a shape of the object candidate rectangle extracted by the object candidate extraction unit 22. The rectangular modification model is regarded as a model using neural network, or the like.

The optimization unit 29 optimizes the object candidate extraction model which the object candidate extraction unit 22 uses and the classification model which the prediction unit 28 uses, by using the prediction result input from the prediction unit 28 and the correct answer data input from the correct answer data output unit 27. In detail, the optimization unit 29 calculates losses between the prediction result and the correct answer data, and optimizes parameters of the object candidate extraction model and the classification model based on the obtained loss. Here, the losses include a classification loss related to the label of the detected target object included in the object rectangle and a regression loss related to the coordinates of the object rectangle. In the calculation of the classification loss, the optimization unit 29 uses the foreground label, the background label, the background object label of the foreground, and the background object label of the background as the correct answer data. In addition, the optimization unit 29 may optimize the foreground background prediction model of the object candidate extraction unit 22 or the rectangular modification model of the prediction unit 28 based on the obtained losses.

As described above, the losses are calculated using the correct answer label of the background object included in the foreground rectangle and the background rectangle in the present example embodiment, in addition to the foreground label and the background label which are commonly used, and optimizations of the object candidate extraction model and the classification model are performed. As a result, it is possible to perform learning of the object candidate extraction model and the classification model in consideration of not only the object detected as the foreground but also the object existing in a background in the object candidate rectangle, so to perform the object detection with higher accuracy depending on a state and an environment in which the object to be detected exists.

(Learning Process)

FIG. 4 is a flowchart of a learning process of the learning apparatus 100 according to the present example embodiment. This process is realized by the processor 13 illustrated in FIG. 1, which executes a program prepared in advance and operates as each element depicted in FIG. 2.

First, the image data acquisition unit 21 acquires the image data from the training data storage unit 20, and the label data acquisition unit 23 acquires the label data from the training data storage unit 20 (step S11). Next, the object candidate extraction unit 22 extracts the object candidate from the image data using the object candidate extraction model (step S12). Subsequently, the foreground/background label determination unit 24 determines the foreground label and the background label of the object candidate rectangle (step S13). After that, the foreground-background object label determination unit 25 determines the background object label of the foreground using the foreground label of the object candidate rectangle and the label data, and the background-background object label determination unit 26 determines the background-background object label using the background label of the object candidate rectangle and the label data (step S14).

Next, the prediction unit 28 classifies the object included in the object candidate rectangle using the classification model and outputs a prediction result (step S15). Next, the optimization unit 29 optimizes the object candidate extraction model which the object candidate extraction unit 22 uses and the classification model which the prediction unit 28 uses, by using the correct answer data, which includes the foreground label, the background label, the background object label of the foreground, and the background object label of the background, and the prediction result output by the prediction unit 28 (step S16). Next, the optimization unit 29 determines whether or not processes of steps S11 through S16 have been repeated a predetermined number of times (step S17). When the processes have not been repeated the predetermined number of times (step S17: No), the learning process goes back to step S11 so as to repeat steps S11 to S16. On the other hand, when the processes have been repeated the predetermined number of times (step S17: Yes), the learning process is terminated.

(Variations of Correct Answer Data)

Next, variations of the correct answer data will be described.

(1) Formats of Correct Answer Data

The correct answer data can be any of the following formats, or a combination thereof.

FIG. 5A illustrates a format A of the correct answer data used in the above example embodiment. The correct answer data of the format A includes the foreground label, the foreground background object label, the background label, and the background object label.

FIG. 5B illustrates another format B of the correct answer data. The correct answer data of the format B includes the background object label of the foreground and the background object label of the background. Because pieces of information indicated by the foreground label and the background label are also included respectively in the background object label of the foreground and the background object label of the background, the foreground label and the background label are omitted in the format B.

FIG. 5C illustrates yet another format C of the correct answer data. The correct answer data of the format C includes a one-dimensional foreground/background label, which indicates whether the object candidate rectangle is a foreground or a background, and the background object label. In this case, the background object label includes the background object label of the foreground and the background object label of the background in the format A.

FIG. 5D illustrates still another format D of the correct answer data. The correct answer data of the format D includes the background label and the background object label. In this format D, different from the background label in the format A, the background label here indicates an area rate of the background region in the object candidate rectangle (corresponding to an area rate R2 to be described later). In addition, the background object label here indicates an area rate of each object in the object candidate rectangle (corresponding to an area rate R1 to be described later).

(II) Type of Background Object Label

Next, a type of the background object label included in the correct answer data will be described. FIG. 6 illustrates a plurality of types for the background object label. As the background object label, any of the following types can be used. Note that as a premise, a region C depicted in FIG. 6 illustrates the foreground rectangle or the background rectangle, a region (A+B) illustrates a rectangle of the background object, and a region B is the foreground rectangle or the background rectangle and represents an overlap area with the rectangle of the background object. Incidentally, the rectangle of the background object is obtained from the label data prepared in advance.

(1) For a label type 1, a label value for an object is set to "1" when a background object is included in the foreground rectangle or the background rectangle, and the label value for the object is set to "0" when no background object is included in the foreground rectangle or the background rectangle. That is, the label value is set as a flag indicating "0" or "1".

(2) For a label type 2, an IOU of the foreground rectangle or the background rectangle and a rectangle of the background object is used as the label value. In an example of FIG. 6, the IOU is given by the following equation (1).

$$\text{IOU} = B/(A+B+C) \qquad (1)$$

(3) For a label type 3, the area rate R2 of the background object included in the foreground rectangle or the background rectangle. The area rate R2 is given by the following equation (2).

$$\text{Area rate } R2 = (\text{an area of the background object included in the foreground rectangle or the background rectangle})/(\text{an area of the foreground rectangle or the background rectangle}) \qquad (2)$$

(4) For a label type 4, a label of one background object is represented by two area rates R1 and R2. Here, the area rate R2 is given by the above equation (2). On the other hand, the area rate R1 is given by the following formula (3):

$$\text{Area rate } R1 = (\text{the area of the background object included in the foreground rectangle or the background rectangle})/(\text{an area of the background object}) \qquad (3)$$

(5) For a label type 5, a label of one background object is represented by the IOU and the area rate R2.

(Specific Example of Correct Answer Data)

Figure 7:
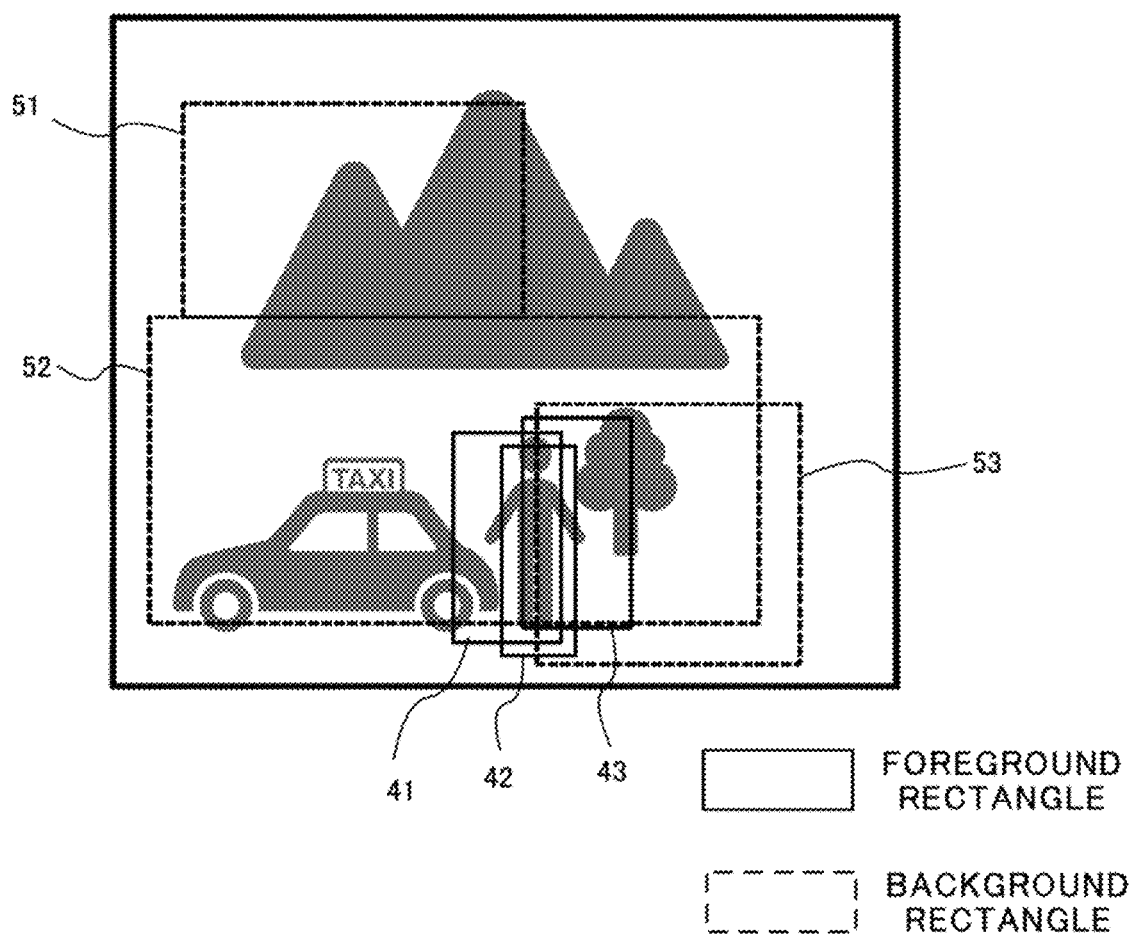
FIG. 7 illustrates an example of a rectangle extracted from the image data.

Next, a specific example of the correct answer data will be described. In the following, combinations of the above formats A through C and the label types 1 through 5 will be described. Now, as the training data, it is assumed that there are the image data illustrated in FIG. 7. As described above, objects to be detected is the "person", the "car", and the "tree". Moreover, it is assumed that rectangles 41 through 43 are determined to be foreground rectangles and rectangles 51 through 53 are determined to be background rectangles, by the foreground/background label determination unit 24 illustrated in FIG. 2.

FIG. 8 illustrates an example of the correct answer data in a case of the format A and the label type 1 described above. The foreground label, the background label, the background object label of the foreground, and the background object label of the background are all three-dimensional vectors. The foreground label and the background object label of the foreground are determined for the foreground rectangles 41 through 43, and the background label and the background object label of the background are determined for the background rectangles 51 through 53. In the foreground label, label values of foreground objects "person" are all "1". In the background object label of the foreground, the label value "1" is set for each of objects included in the foreground rectangles 41 through 43. Note that the background object labels of the foreground also include a label of the foreground object "person". For background labels, all label values are "0". In the background object label of the foreground, the label value "1" is set for each of objects included in the background rectangles 51 through 53.

FIG. 9 illustrates an example of the correct answer data for a case of the format A and the label type 2. The foreground label and the background label are similar to an example in FIG. 8. In the background object label of the foreground, IOU values of respective foreground rectangles and the correct answer labels 61 through 63 illustrated in FIG. 3 are set with respect to the foreground rectangles 41 through 43. For instance, since the IOU value of the rectangle 41 and the correct answer label 62 of the car indicates "0.2", the IOU value of the rectangle 41 and the correct answer label 61 of the person indicates "0.8", and the IOU value of the rectangle 41 and the correct answer label 63 of the tree indicates "0", the background object label of the rectangle 41 indicates a car "0.2", a person "0.8", and a tree "0". The background label is similar to the example in FIG. 8. Similar to the background object label of the foreground, for the background object label of the background, the IOU values of the rectangles 51 through 53 and the correct answer labels 61 through 63 are set as label values.

FIG. 10 illustrates an example of the correct answer data for a case of the format C and the label type 1. In the format C, the foreground/background label is a one-dimensional vector, and indicates a foreground rectangle or a background rectangle. In an example in FIG. 10, each foreground/background label indicates "1" with respect to the foreground rectangles 41 through 43 and the foreground/background label indicates "0" with respect to the background rectangles 51 through 53. The background object label is a three-dimensional vector, and for each of the rectangles 41 through 43 and 51 through 53, each label value indicates "1" in a case where the object to be detected is included and indicates "0" in a case where the object to be detected is not included.

FIG. 11 illustrates an example of the correct answer data for a case of the format C and the label type 3. The foreground/background label is similar to the example in FIG. 10. In the background object label, the aforementioned area rate 2, that is, "the area of the background object included in the rectangle" relative to "the area of the rectangle" is set as the label value. Specifically, for the rectangle 41, an area rate of an area of the car relative to an area of the rectangle 41 is "0.2" and is set as the label value of the car, and an area rate of an area of the person to an area of the rectangle 41 is "0.7" and is set as the label value of the person.

FIG. 12 illustrates an example of the correct answer data for a case of the format D and the label type 3. In the format D, the background label is represented by a one-dimensional vector and the background object label is represented by a three-dimensional vector. In the format D, as the value of the background label, a rate of "the region of the background (the area where the object to be detected does not exist)" relative to "the area of the rectangle" is used for each rectangle. Specifically, since the area rate in the rectangle 41 is "0.2" as the car, "0.7" as the person, "0" as the tree and "0.1" as the background, a label value "0.1" is set for the background label. The same applies to other rectangles. The background object label uses the area rate R2 in the same manner as the example illustrated in FIG. 11.

(Structure at a Time of Inference)

Figure 13:
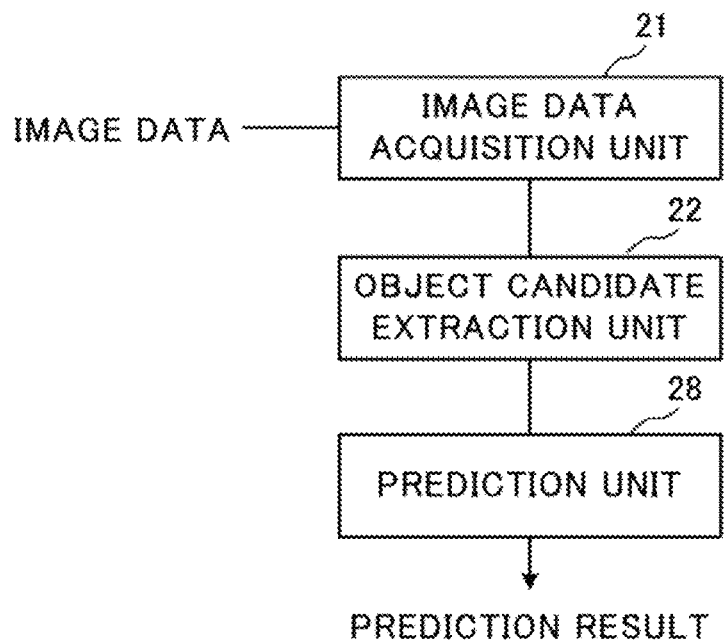
FIG. 13 is a block diagram illustrating a functional configuration of an object detection apparatus.

FIG. 13 is a block diagram illustrating a functional configuration of an object detection apparatus 200. The object detection apparatus 200 includes an image data acquisition unit 21, an object candidate extraction unit 22, and a prediction unit 28. The image data acquisition unit 21, the object candidate extraction unit 22, and the prediction unit 28 are basically the same as those of the learning apparatus 100 illustrated in FIG. 2. However, an object candidate detection model trained by the above-described learning process is used in the object candidate extraction unit 22, and a classification model trained by the above-described learning process is used for the prediction unit 28.

The image data acquisition unit 21 acquires image data to be a target of an object detection and outputs the image data to the object candidate extraction unit 22. The object candidate extraction unit 22 extracts each object candidate rectangle from the image data using the trained object candidate extraction model. The prediction unit 28 classifies an object included in the object candidate rectangle using the trained classification model, and outputs a prediction result.

Second Example Embodiment

Figure 14:
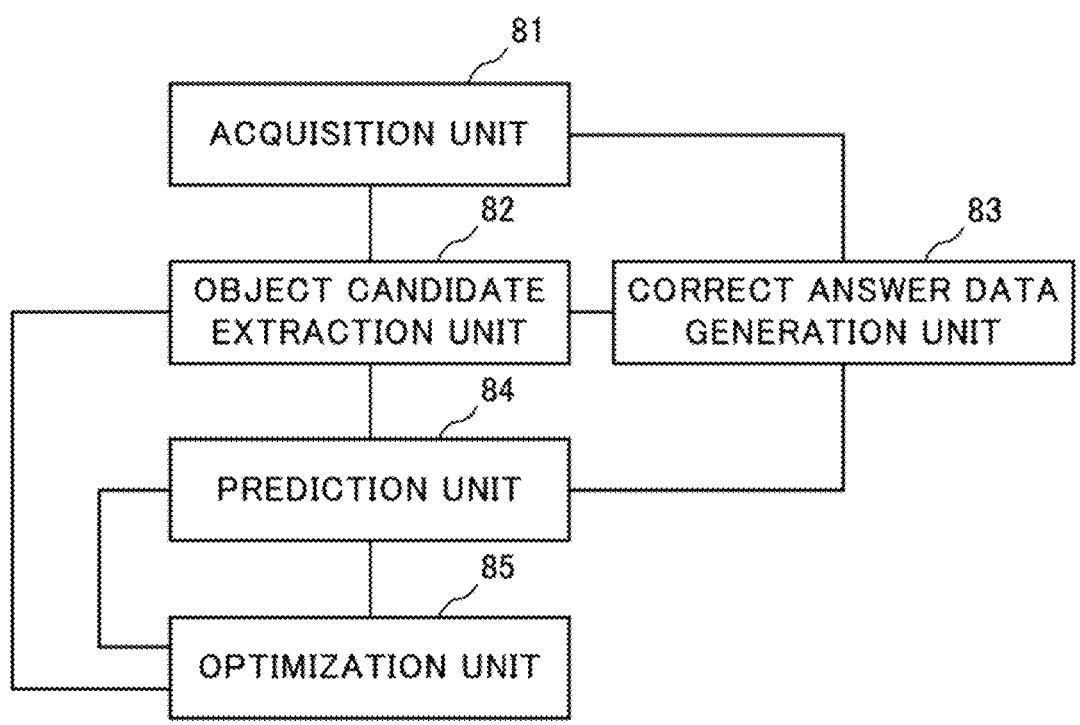
FIG. 14 is a block diagram illustrating a functional configuration of a learning apparatus according to a second example embodiment.

Next, a second example embodiment of the present disclosure will be described. FIG. 14 is a block diagram illustrating a functional configuration of a learning apparatus 80 according to the second embodiment. The learning apparatus 80 includes an acquisition unit 81, an object candidate extraction unit 82, a correct answer data generation unit 83, a prediction unit 84, and an optimization unit 85.

The acquisition unit 81 acquires image data and label data corresponding to the image data. The object candidate extraction unit 82 extracts each object candidate rectangle from the image data. The correct answer data generation unit 83 generates a background object label for a background object included in each object candidate rectangle as correct answer data for the object candidate rectangle using the label data. The prediction unit 84 predicts a classification using the object candidate rectangle and outputs a prediction result. The optimization unit 85 optimizes the object candidate extraction unit and the prediction unit using the prediction result and correct answer data.

A part or all of the example embodiments described above may also be described as the following supplementary notes, but not limited thereto.

(Supplementary Note 1)

1. A learning apparatus comprising:
   an acquisition unit configured to acquire image data and label data corresponding to the image data;
   an object candidate extraction unit configured to extract each object candidate rectangle from the image data;
   a prediction unit configured to predict a classification using each object candidate rectangle and output a prediction result;
   a correct answer data generation unit configured to generate a background object label corresponding to each background object included in the object candidate rectangle as correct answer data corresponding to the object candidate rectangle by using the label data; and
   an optimization unit configured to optimize the object candidate extraction unit and the prediction unit by using the prediction result and the correct answer data.

(Supplementary Note 2)

2. The learning apparatus according to supplementary note 1, wherein the correct answer data generation unit generates a foreground label indicating whether or not the object candidate rectangle is a foreground rectangle, a background label indicating whether or not the object candidate rectangle is a background rectangle, the background object label of a foreground indicating a background object in the foreground rectangle, and the background object label of a background indicating the background object in the background rectangle.

(Supplementary Note 3)

3. The learning apparatus according to supplementary note 1, wherein the correct answer data generation unit generates the background object label of a foreground indicating each background object included in each object candidate rectangle that is a foreground rectangle, and the background object label of a background indicating each background object included in each object candidate rectangle that is a background rectangle.

(Supplementary Note 4)

4. The learning apparatus according to supplementary note 1, wherein the correct answer data generation unit generates a foreground/background label indicating whether the object candidate rectangle is a background rectangle or a foreground rectangle and the background object label indicating each background object included in the foreground rectangle or the background rectangle.

(Supplementary Note 5)

5. The learning apparatus according to any one of supplementary notes 1 through 4, wherein the background object label is a flag indicating presence or absence of a background object in the object candidate rectangle.

(Supplementary Note 6)

6. The learning apparatus according to any one of supplementary notes 1 through 4, wherein the background object label corresponds to a value indicating a degree of an overlap of the object candidate rectangle and the background object.

(Supplementary Note 7)

7. The learning apparatus according to any one of supplementary notes 1 through 4, wherein the background label indicates a rate of an area of the background object included in the object candidate rectangle relative to an area of the object candidate rectangle.

(Supplementary Note 8)

8. The learning apparatus according to any one of supplementary notes 1 through 4, wherein the background object label indicates a rate of an area of the background object included in the object candidate rectangle relative to an area of the background object.

(Supplementary Note 9)

9. The learning apparatus according to supplementary note 1, wherein
the correct answer data generation unit generates a background label and the background object label,
the background label indicates a rate of an area of a region where an object to be detected is absence in the object candidate rectangle relative to an area of the object candidate rectangle; and
the background object label indicates a rate of an area of an object in the object candidate rectangle relative to the area of the object candidate rectangle.

(Supplementary Note 10)

10. A learning method, comprising:
acquiring image data and label data corresponding to the image data;
extracting each object candidate rectangle from the image data;
predicting a classification using each object candidate rectangle and outputting a prediction result;
generating a background object label corresponding to each background object included in the object candidate rectangle as correct answer data corresponding to the object candidate rectangle by using the label data; and
optimizing the extracting of each object candidate rectangle and the predicting of the classification by using the prediction result and the correct answer data.

(Supplementary Note 11)

11. A recording medium storing a program, the program causing a computer to perform a process comprising:
acquiring image data and label data corresponding to the image data;
extracting each object candidate rectangle from the image data;
predicting a classification using each object candidate rectangle and outputting a prediction result;
generating a background object label corresponding to each background object included in the object candidate rectangle as correct answer data corresponding to the object candidate rectangle by using the label data; and
optimizing the extracting of each object candidate rectangle and the predicting of the classification by using the prediction result and the correct answer data.

While the disclosure has been described with reference to the example embodiments and examples, the disclosure is not limited to the above example embodiments and examples. It will be understood by those of ordinary skill in the art that various changes in form and details may be made therein without departing from the spirit and scope of the present disclosure as defined by the claims.

DESCRIPTION OF SYMBOLS

20 Learning data storage unit
21 Image data acquisition unit
22 Object candidate extraction unit
23 Label data acquisition unit
24 Foreground/background label determination unit
25 Foreground-background object label determination unit
26 Background-background object label determination unit
27 Correct answer data output unit
28 Prediction unit
29 Optimization unit
30 Correct answer data generation unit

What is claimed is:

1. A learning apparatus comprising:
a memory storing instructions; and
one or more processors configured to execute the instructions to:
acquire image data and label data corresponding to the image data;
extract each object candidate rectangle from the image data;
predict a classification using each object candidate rectangle and output a prediction result;
generate a background object label corresponding to each background object included in the object candidate rectangle as correct answer data corresponding to the object candidate rectangle by using the label data; and
optimize the extracting of each object candidate rectangle and the predicting of the classification by using the prediction result and the correct answer data,
wherein the background object label indicates one of:
(a) a value indicating a degree of an overlap of the object candidate rectangle and the background object;
(b) a rate of an area of the background object included in the object candidate rectangle relative to an area of the object candidate rectangle; and (c) a rate of an area of the background object included in the object candidate rectangle relative to an area of the background object.

2. The learning apparatus according to claim 1, wherein the processor generates a foreground label indicating whether or not the object candidate rectangle is a foreground rectangle, a background label indicating whether or not the object candidate rectangle is a background rectangle, the background object label of a foreground indicating a background object in the foreground rectangle, and the background object label of a background indicating the background object in the background rectangle.

3. The learning apparatus according to claim 1, wherein the processor generates the background object label of a foreground indicating each background object included in each object candidate rectangle that is a foreground rectangle, and the background object label of a background indicating each background object included in each object candidate rectangle that is a background rectangle.

4. The learning apparatus according to claim 1, wherein the processor generates a foreground/background label indicating whether the object candidate rectangle is a background rectangle or a foreground rectangle and the background object label indicating each background object included in the foreground rectangle or the background rectangle.

5. A learning apparatus comprising:
a memory storing instructions; and
one or more processors configured to execute the instructions to:
acquire image data and label data corresponding to the image data;
extract each object candidate rectangle from the image data;
predict a classification using each object candidate rectangle and output a prediction result;
generate a background object label corresponding to each background object included in the object candidate rectangle as correct answer data corresponding to the object candidate rectangle by using the label data; and
optimize the extracting of each object candidate rectangle and the predicting of the classification by using the prediction result and the correct answer data, wherein
the processor generates a background label and the background object label,
the background label indicates a rate of an area of a region where an object to be detected is absence in the object candidate rectangle relative to an area of the object candidate rectangle; and
the background object label indicates a rate of an area of an object in the object candidate rectangle relative to the area of the object candidate rectangle.

6. A learning method performed by a computer and comprising:
acquiring image data and label data corresponding to the image data;
extracting each object candidate rectangle from the image data;
predicting a classification using each object candidate rectangle and outputting a prediction result;
generating a background object label corresponding to each background object included in the object candidate rectangle as correct answer data corresponding to the object candidate rectangle by using the label data; and
optimizing the extracting of each object candidate rectangle and the predicting of the classification by using the prediction result and the correct answer data,
wherein the background object label indicates one of:
(a) a value indicating a degree of an overlap of the object candidate rectangle and the background object;
(b) a rate of an area of the background object included in the object candidate rectangle relative to an area of the object candidate rectangle; and
(c) a rate of an area of the background object included in the object candidate rectangle relative to an area of the background object.

7. A non-transitory computer-readable recording medium storing a program executable by a computer to perform the learning method according to claim 6.

* * * * *